United States Patent [19]
Dufresne

[11] Patent Number: 6,059,956
[45] Date of Patent: *May 9, 2000

[54] OFF-SITE PRETREATMENT OF A HYDROCARBON TREATMENT CATALYST

[75] Inventor: Pierre Dufresne, Valence, France

[73] Assignee: Europeene de Retraitment de Catalyseurs Eurecat, France

[*] Notice: This patent issued on a continued prosecution application filed under 37 CFR 1.53(d), and is subject to the twenty year patent term provisions of 35 U.S.C. 154(a)(2).

[21] Appl. No.: 08/541,680

[22] Filed: Oct. 10, 1995

[30] Foreign Application Priority Data

Oct. 7, 1994 [FR] France .................................. 94 12096

[51] Int. Cl.$^7$ .......................... B01J 27/02; B01J 27/047; B01J 27/049; B01J 27/051
[52] U.S. Cl. ......................... 208/108; 208/143; 208/215; 208/216 R; 502/216; 502/219; 502/220; 502/221
[58] Field of Search .............................. 502/33, 216, 168, 502/220, 38, 219, 221, 108, 143, 215, 216 R; 208/108, 143, 215, 216 R

[56] References Cited

U.S. PATENT DOCUMENTS

| Re. 31,443 | 11/1983 | McDaniel et al. .......................... 526/98 |
|---|---|---|
| 3,116,259 | 12/1963 | Geerts et al. ............................ 252/439 |
| 3,211,670 | 10/1965 | Kaplan et al. ........................... 252/414 |
| 3,456,029 | 7/1969 | Morita et al. ............................ 260/677 |
| 3,519,573 | 7/1970 | Coe ........................................ 502/220 |
| 3,658,927 | 4/1972 | Crain et al. .......................... 260/666 A |
| 3,666,687 | 5/1972 | Croce et al. ............................. 252/439 |
| 3,686,137 | 8/1972 | Gatti ........................................ 252/437 |
| 3,816,294 | 6/1974 | Wilson et al. ............................. 208/61 |
| 3,844,932 | 10/1974 | Gomi et al. ............................... 208/57 |
| 3,932,548 | 1/1976 | Rausch ................................. 269/668 D |
| 3,952,070 | 4/1976 | Nowak et al. ....................... 260/683 D |
| 3,997,427 | 12/1976 | Eng et al. ................................. 208/67 |
| 4,048,058 | 9/1977 | Petersen et al. ........................ 208/138 |
| 4,065,379 | 12/1977 | Soonawala et al. ...................... 208/67 |
| 4,072,629 | 2/1978 | Janssen .................................. 252/416 |
| 4,110,203 | 8/1978 | Hilfman ................................. 208/216 |
| 4,138,325 | 2/1979 | Beuther et al. ........................... 208/50 |
| 4,149,965 | 4/1979 | Pine et al. ........................... 208/216 R |
| 4,171,258 | 10/1979 | Gaspar ................................... 208/144 |
| 4,176,049 | 11/1979 | Winter et al. .............................. 208/70 |
| 4,180,453 | 12/1979 | Franck et al. ............................. 208/57 |
| 4,331,559 | 5/1982 | Banasiak ............................. 252/429 R |
| 4,334,982 | 6/1982 | Jacquin et al. ...................... 208/216 R |
| 4,347,123 | 8/1982 | Mauldin et al. ........................ 208/136 |
| 4,487,986 | 12/1984 | Kukes ..................................... 585/645 |
| 4,548,920 | 10/1985 | Thompson et al. ..................... 502/219 |
| 4,567,159 | 1/1986 | Banks et al. ............................ 502/219 |
| 4,619,757 | 10/1986 | Zimmerman .............................. 208/57 |
| 4,666,878 | 5/1987 | Jacobson et al. ....................... 502/221 |
| 4,698,145 | 10/1987 | Ho et al. ................................... 208/18 |
| 4,705,619 | 11/1987 | McCandilish et al. ................. 208/112 |
| 4,724,068 | 2/1988 | Stapp ..................................... 208/213 |
| 4,740,295 | 4/1988 | Bearden et al. ........................ 208/421 |
| 4,826,797 | 5/1989 | Chianelli et al. ....................... 502/221 |
| 4,864,067 | 9/1989 | Harandi et al. ......................... 585/254 |
| 4,982,043 | 1/1991 | Hasselbring ........................... 585/516 |
| 4,983,558 | 1/1991 | Born et al. ................................ 502/31 |
| 5,039,392 | 8/1991 | Bearden, Jr. et al. .................. 502/211 |
| 5,139,983 | 8/1992 | Berrebi et al. ............................ 502/33 |
| 5,153,163 | 10/1992 | Roumieu et al. ....................... 502/222 |
| 5,155,073 | 10/1992 | Elvin ........................................ 502/31 |
| 5,198,100 | 3/1993 | Aldridge et al. ......................... 208/89 |
| 5,235,121 | 8/1993 | Brinkmeyer et al. ..................... 502/38 |
| 5,338,717 | 8/1994 | Aldridge et al. ........................ 502/211 |
| 5,565,089 | 10/1996 | Ramachandran et al. ................ 502/38 |
| 5,654,252 | 8/1997 | Dufresne et al. ....................... 502/216 |
| 5,688,736 | 11/1997 | Seamans et al. ........................ 502/216 |
| 5,985,787 | 11/1999 | Dufresne et al. ....................... 502/220 |

FOREIGN PATENT DOCUMENTS

| 0 002 272 | 6/1979 | European Pat. Off. . |
|---|---|---|
| 0 530 068 | 3/1993 | European Pat. Off. . |
| 1349022 | 3/1963 | France . |
| 2149429 | 3/1973 | France . |

*Primary Examiner*—Wayne Langel
*Attorney, Agent, or Firm*—Millen, White, Zelano & Branigan, P.C.

[57] ABSTRACT

A process comprising incorporation of a sulphuration agent into a hydrocarbon treatment catalyst to a greater or lesser extent into the pores of the catalyst, the agent being selected from, for example, elemental sulphur and organic polysulphides, incorporation being effected in the presence of a solvent which is an olefinic or olefinic cut constituent, for example a vegetable oil, or a similar constituent, the process comprising hydrogen treatment of the catalyst at between 150° C. and 700° C., followed by a passivation step.

12 Claims, No Drawings

OFF-SITE PRETREATMENT OF A HYDROCARBON TREATMENT CATALYST

SUMMARY OF THE INVENTION

The present invention concerns a pretreatment or activation process for a hydrocarbon hydroconversion catalyst initially including off-site presulphuration of the catalyst. However, instead of being directly activated in hydrogen in the hydrocarbon conversion reactor, the catalyst is activated ex situ (off-site) in the presence of hydrogen, and then still ex situ (off-site), air is re-admitted before transport then loading into the hydrocarbon conversion reactor.

The invention thus involves pretreating a catalyst using an off-site process comprising:

incorporation of a sulphuration agent into the catalytic mass, hydrogen treatment of the catalyst at between 150° C. and 700° C., re-admission of air into the catalyst.

The catalysts of the invention can, for example, be constituted by an alumina or doped alumina support (doped with fluorine, chlorine, boron or silicon) or a different support based on at least one metal or metalloid oxide (magnesia, silica, silica-alumina, silica-magnesia, clay, charcoal, or mixtures thereof) these supports possibly being at least partially amorphous or crystalline (zeolite) and the catalyst further containing 0.2% to 40% of at least one active metal from groups VI, VIII or others selected, for example, from cobalt, molybdenum, nickel and tungsten. In general, a metal couple is used, for example cobalt-molybdenum, nickel-molybdenum, or nickel-tungsten. A precious metal from group VIII of the platinum family: Pt, Pd, can also be used.

In the prior art, before use the new or regenerated catalyst undergoes sulphuration (presulphuration) carried out in the hydrotreatment reactor. This sulphuration means that, for example, about 50% to 110% of the stoichiometric quantities of sulphur calculated from the quantities of sulphides with formulae (depending on the metals present) $Co_9S_8$, $MoS_2$, $WS_2$ and $Ni_3S_2$ can be included in the catalyst. The active phases of these catalysts are mixed sulphides while new or regenerated catalysts contain oxides.

In the prior art, sulphuration (presulphuration) is carried out at a temperature close to or higher than (i.e., above 180° C., in particular above 250° C.) the reaction temperature selected for the hydrodesulphuration, hydrocracking or hydrogenation reaction, for several hours using a sulphur-containing compound mixture which is generally diluted with hydrogen.

More and more often, catalysts are being regenerated by a catalyst regeneration specialist, sometimes far from the industrial unit. It would appear to be reasonable to return a product to the refiner which was ready for use, as is efficiently accomplished in our European patents EP-B-0 130 850 and EP-B- 0 181 254 in which a sulphur-containing compound is incorporated into the catalytic mass, the compound causing sulphuration or presulphuration of the catalyst when the catalyst is subsequently brought into contact with hydrogen in the reaction zone (feed treatment zone) or immediately proximate to the reaction zone. This sulphur-containing compound can, of course, be incorporated near to the industrial unit or even at the catalyst treatment site; the incorporation process for the sulphur-containing compound can also be carried out off-site on a new or regenerated catalyst, before use in the industrial unit.

The refiner or any other user then activates the catalyst in the hydrocarbon conversion reactor in the presence of hydrogen at a temperature, for example, of 250° C. to 350° C. (for a desulphuration catalyst, for example, in order to react the sulphur with the metals contained and thus immediately start the hydrocarbon refining or conversion reaction by injection of the feed to be treated).

The present process improves the activation of the catalyst and is characterized by an off-site treatment of the catalyst in the presence of hydrogen followed by re-admission of air to effect oxidizing passivation of the catalyst. After this stage, the catalyst is sent to the refiner. This sulphuration treatment can be carried out on a new or regenerated catalyst.

The invention thus concerns a process involving:

a. off-site incorporation into the catalytic mass, for example into the pores, of at least one sulphuration agent, this agent being a sulphur-containing compound selected from by elemental sulphur, organic polysulphides (described in European patents EP-B-0 130 850 and EP-B-0 181 254), hydrogen sulphide ($H_2S$), mercaptans, carbon disulphide $CS_2$, sulphides, disulphides, thiophenyl compounds or any other molecule containing sulphur which can decompose in hydrogen to produce mainly hydrogen sulphide (preferably, sulphur, organic polysulphides, dimethylsulphide (DMS) and dimethyldisulphide (DMDS) are used. At least one solvent can be used, for example a white spirit or a petrol which can be dearomatized or not (as described in EP-B-0 130 850) and EP-B-0 181 254), and/or at least one other suitable solvent, in particular at least one constituent containing olefinic carbon bonds, for example a constituent as described in EP-A-0 564 317: by way of example, a mixture comprising 0.1% to 99.9% by weight of a white spirit or an equivalent solvent and 99.9% to 0.1% of an olefinic compound or constituent, preferably 2% to 98% of a white spirit or equivalent solvent and 2% to 98% of at least said olefinic compound. In general, the constituent which is used alone or as a mixture can be any hydrocarbon or hydrocarbon cut which contains double bonds. These may be olefins (monolefins, diolefins or polyolefins) or petroleum cuts which contain olefins, such as cuts from certain oil refining processes, in particular visbreaking, carbonization or steam cracking. This constituent is preferably a triglyceride of unsaturated fatty acids such as vegetable oils.

When the compound or constituent is a constituent of vegetable oils, it is preferably a fatty acid triglyceride. Examples of these oils are those derived from unsaturated fatty acids such as ethylenic acids, for example myristoleic acid, palmitoleic acid, oleic acid, elaidic acid (a geometric isomer of oleic acid), gadoleic acid, erucic acid, polyethylenic acids (polyethylenic acids of oils, for example linoleic acid and linolenic acid), these oils can also contain saturated fatty acids such as butyric acid, caproic acid, caprylic acid, capric acid, lauric acid, myristic acid, palmitic acid, stearic acid or arachidic acid. Thus the constituent used in formulating the mixture (mixture-solvent) can be based on an ester of a fatty acid, the acid containing 6 to 24 carbon atoms and one, two or three olefinic bonds or being based on rapeseed, peanut, soya, corn, sunflower seed, safflower, palm or linseed oil, or animal fats from tallow or lard. As indicated above, preferred oils are rapeseed, peanut, soya, corn, sunflower, safflower, palm and linseed oil.

Introduction of the sulphuration agent is effected in temperature ranges of between 0° C. and 200° C. (preferably 30° C.–200° C.), for example.

The sulphuration agent is thus introduced into the catalytic mass, depending on the selected temperatures as indicated above, either by melting and/or sublimation, or by dissolving, or in the form of a suspension, or by passage of the gaseous sulphuration agent, or partially using one of these techniques and partially using another of the techniques indicated above. It can be introduced in the absence of a solvent or other additive.

b. By optional ex situ (off-site) heat treatment of the catalyst in the absence of hydrogen at a temperature of more than 100° C., generally and preferably more than 120° C. This treatment is recommended in certain cases, in particular when the catalyst has been brought into contact with the sulphuration agent and a liquid which optionally contains a white spirit solvent or a related solvent and an olefinic solvent; the mixture obtained is then heat treated to eliminate the solvent, and start the combination reaction between sulphur and the double bonds of the olefinic compound. Heat treatment is carried out at a temperature of more than 100° C., preferably more than 120° C. If the sulphuration agent is elemental sulphur, this then partially or completely combines as a polysulphide. This reaction is analogous to that known in a completely different technical field, that of the tyre industry where the process is known as vulcanization. This process is used to improve the mechanical properties of natural rubber, and is effected by adding elemental sulphur to natural rubber followed by heat treatment. The sulphur reacts with the double bonds in the rubber, which is a polyisoprene, to form mono- or polysulphide bridges between the carbon chains.

c. Off-site (ex situ) treatment of the catalyst is carried out in pure or diluted hydrogen (dilution of between 1% and 50%, preferably between 2% and 20% of hydrogen), between 150° C. and 700° C., preferably between 250° C. and 600° C. Atmospheric pressure is generally employed, for several hours (for example 1 to 10 hours). There is a great flexibility in the operating conditions for this step: selecting the temperature, gas, dilution, nature of the catalytic bed (fixed, rotating, mobile, expanded, turbulent, fluid bed) means that maximum homogeneity can be obtained in the distribution of the sulphuration agent in the catalytic bed at a temperature which is rigorously constant for all the grains in the bed. Step (c) can be carried out after steps (a) and (b). It can also be carried out simultaneously with step (a), namely introduction of the sulphuration agent and the hydrogen treatment are simultaneous. In this case there is no step (b).

d. The catalyst is cooled, optionally off-site (generally to ordinary temperature), for example in an inert gas stream or by leaving the catalyst in an inert gas atmosphere (for example nitrogen).

e. Passivation ex situ (off-site). By way of example, this passivation is an oxidizing passivation, consisting of passing a stream of oxygen, preferably diluted (concentration by volume of less than 30%, preferably less than 10%, more preferably less than 5%), and/or by passing a stream of air (re-admission of the atmosphere) over the catalyst, during which step(s) partial re-oxidation of the metallic sulphides incorporated in the catalytic mass occurs (oxidizing passivation). During this step, oxygen is adsorbed by the catalyst. This step produces a catalyst with a higher activity than that observed with other catalysts in which the sulphuration agent is introduced using prior art methods. Contact of the catalyst with diluted oxygen (or any gas containing oxygen, for example molecular oxygen) can be made in two stages or several stages with a gradual increase in the oxygen concentration, for example about 1% then 5%.

The invention is particularly suitable for incorporating a sulphuration agent into hydrotreatment catalysts when these are then loaded into a reactor in a hydrotreatment zone then exposed again to hydrogen in the hydrotreatment zone.

Other advantages of the process are as follows: after treatment, the catalyst is ready for use. It can be used in refining or the petrochemicals industry after a simple initiation procedure which consists of directly injecting the feed to be treated at low temperature, even at room temperature without risking lixiviation of the sulphur. There is a fundamental difference in the catalyst which is chemically discernible on analysis: following the hydrogen treatment, a sulphide phase is present; if, for example, the active elements are molybdenum, tungsten, cobalt or nickel, then the following sulphide type(s) are present: $MoS_2$ (here $Mo^{4+}$ corresponds to one sulphur atom), $Co_9S_8$, $WS_2$, $Ni_3S_2$.

The "sulphide" phases in the treated catalyst of the invention at this stage of the preparation, i.e., after treatment with $H_2$, are clearly identified and identifiable by electron spectroscopy (SPX) which can, for example, show that the molybdenum or tungsten are mainly (in general more than 70%) in oxidation state 4 ($MoS_2$, $WS_2$) while they are totally in oxidation state 6 ($MoO_3$, $WO_3$) in a new or regenerated catalyst, and also mostly (>50%) in oxidation state 6 in a presulphurated catalyst using the prior art processes, this latter catalyst containing oxysulphide phases.

One very important conceptual difference between the invention and prior art processes is as follows: previously, the user loaded a hydrotreatment catalyst containing metals into the reactor, the catalyst being chemically in the oxide or oxysulphide state. They would not yet be catalytically active and sulphides would only be produced in the reactor. This delicate step, that of producing the active phase, could be poorly effected and was above all uncontrollable and not characterisable. The object of the present invention is to provide the user with a catalyst which is already active, with a catalytic activity which is characterisable prior to loading into the reactor. This invention eliminates any risk of obtaining non-optimal catalytic activity in the reactor.

The quantity of sulphur incorporated into the catalytic mass during step (a) generally corresponds to 50% to 150% of the stoichiometric quantity required for presulphuration of the active elements of the catalyst, preferably between 80% and 110%, more particularly between 90% and 105% of this stoichiometric quantity.

Further, passivation, for example oxidizing passivation, also eliminates the pyrophoric tendency of the sulphide phases and thus facilitates transfer of the solid into metal drums or other containers. Oxidizing passivation also positively affects the catalytic activity.

The following examples illustrate the invention: the comparative examples illustrate various prior art methods of presulphuration followed by activation in hydrogen of the catalyst in situ in the hydrocarbon conversion reactor. The examples illustrating the invention show the same prior art presulphuration methods but with ex situ (off-site) activation of the catalyst in hydrogen, then ex situ (off-site) passage of diluted oxygen then air over the catalyst before transfer to a hydrocarbon conversion reactor.

EXAMPLES

Example 1 (comparative)

A CoMo dehydrodesulphuration catalyst in 1.2 mm diameter grains containing 19.0% by weight of $MoO_3$ and 4.3% by weight of CoO was used. This was catalyst A of the following examples, and was presulphurated or sulphurated with sulphur contents corresponding to the theoretical stoichiometric value of sulphides $MoS_2$ and $Co_9S_8$. A stoichiometry of 100% corresponded to 10.25% by weight of sulphur, expressed as its dry matter, corrected for the loss on ignition. Catalyst A (1000 g) was mixed with a tertiononylpolysulphide containing 37% by weight of sulphur and with a white spirit solvent, to fill the pore volume (550 ml). The impregnated catalyst was left for one hour in a rotating flask in the cold then for 2 hours at 150° C. to evaporate the hydrocarbons and fix the sulphur of the organic polysulphide. Catalyst B was obtained which had the properties shown in the table.

Example 2 (comparative)

Catalyst A (1000 g) was impregnated with a suspension of 105 g of elemental S, 22 g of rapeseed oil and 330 ml of white spirit, then left for one hour in the cold and then heated for 2 hours at 180° C. Catalyst C was thus obtained.

Example 3 (comparative)

Catalyst A (1000 g) was impregnated with a suspension of 105 g of elemental S and 55 ml of white spirit, then left for one hour in the cold then heated for two hours at 180° C. Catalyst D was thus obtained.

Example 4

Catalysts B, C and D prepared as in the preceding examples were activated in hydrogen in a rotating tubular oven under the following conditions: temperature: 400° C.; time: 6 hours; gas: 5/95 hydrogen/nitrogen mixture; pressure: normal. Following the activation period, the system was cooled, purged for 4 hours with nitrogen then a mixture of 1% of oxygen in nitrogen was passed for 2 hours then 5% of oxygen was passed for 2 hours, then air for 2 hours. Catalysts E, F, G had thus been prepared from catalysts B, C, D.

Example 5

Catalyst B was treated as in Example 4, except that the end of the activation step was only followed by a nitrogen purge and not by oxidizing passivation. The catalyst was poured directly, in the absence of air, into a flask filled with white spirit. Solid H was thus obtained.

Example 6

Sulphurated catalysts A to H were characterized using different methods: carbon and sulphur content, loss on ignition at 500° C., Differential Thermal Analysis (or Differential Scanning Calorimetry—DSC) in one bar of oxygen and a temperature increase rate of 5° C./min, electron spectroscopic analysis (SPX), and a catalytic hydrodesulphuration test (HDS) using gasoil.

The conditions for this test were as follows: feed: atmospheric gasoil with respective initial boiling point and cut points of 220° C. and 370° C.; sulphur content: 0.8% by weight and N content: 120 ppm by weight; pressure: 40 bar; quantity of catalyst: 70 ml; feed flow rate: 140 ml/hour; temperature: 340° C. The starting procedure involved raising the temperature to 320° C. at a rate of 100° C./hour, injection of the liquid test feed at 100° C., a stage of 2 hours at 320° C. and heating to 340° C.

The results of the characterizations are shown in the summarising table and are discussed below.

Catalysts B and C, not in accordance with the invention, employed presulphuration procedures analogous to those claimed in United States patents U.S. Pat. No. 4,530,917, U.S. Pat. No. 4,719,195 and French patent application 92/04051. The catalysts were "presulphurated" to form a metallic oxysulphide phase. The color of the catalysts went from blue to dark grey. The SPX spectra showed that the oxidation state of the molybdenum was still mainly +6, even though substantial modification was noted compared with the spectrum of the fresh catalyst. The catalytic activities of catalysts B and C were close to each other.

Catalyst D, sulphurated simply with sulphur, remained blue: it produced a large DSC isotherm in hydrogen and had low catalytic activity.

Catalysts E, F, and G, in accordance with the invention, were black in color, and produced no exothermal signal on DSC in hydrogen (which is logical since they had already been activated in hydrogen using the process of the invention) Their SPX spectra were characteristic of $MoS_2$ with an oxidation state of 4+. The catalytic activities were substantially higher than those measured for the catalysts prepared in accordance with prior art procedures.

Catalyst H, a homolog of catalyst E but without the oxidizing passivation, was black with a $Mo^{4+}$ nature. Its catalytic activity was nevertheless slightly lower than that of its homologue H, showing the importance of the intermediate passivation procedure.

|  | A | B | C | D | E | F | G | H |
|---|---|---|---|---|---|---|---|---|
| Sulphur (wt %) | / | 8.49 | 8.41 | 9.31 | 7.7 | 8.0 | 7.9 | 7.0 |
| Loss on ignition (wt %) | / | 18.0 | 20.3 | 9.2 | 17.8 | 19.1 | 12.6 | 27.1 |
| Stoichiometry (%) | / | 101 | 103 | 100 | 92 | 96 | 88 | 94 |
| Carbon (wt %) | / | 8.2 | 12.0 | 0.1 | 5.8 | 7.9 | 0.1 | / |
| Colour | blue | dark grey | dark grey | blue | black | black | black | black |
| DSC* | / | + | + | + | – | – | – | / |
| SPX** | Mo 6+ | Mo 6+ > 50% |  |  | Mo 4+ | Mo 4+ |  | Mo 4+ |
| HDS (%)*** | / | 100 | 105 | 71 | 115 | 112 | 107 | 104 |

*DSC: + means an exothermic peak noted at temperatures between 200° C. and 300° C.; – means that no peak is detected in this zone, nor in the whole range of 50–350° C.
**SPX: $Mo^{6+}$ means the molybdenum was mainly in oxidation state 6+; $Mo^{6+}$ > 50% means that at most 50% of the molybdenum was in oxidation state 6+; $Mo^{4+}$ means that the molybdenum was mainly in oxidation state 4+.
***HDS: The hydrodesulphuration activity of catalysts C to H was calculated with reference to the activity of catalyst B (a = 3.66, HDS = 95.4%).

What is claimed is:

1. A process for the preparation of a catalyst, comprising
    introducing a sulphuration agent into a catalytic mass to introduce an amount of sulfur of 80 to 150% based on the stoichiometric amount of active metals in the catalyst, treating the mass with hydrogen to produce a suifided catalyst, wherein more than 50% of said active metals are present in the form of sulfides, passivating the sulfided catalyst by contacting with an oxygen containing gas.

2. A process according to claim 1, in which the sulphuration agent is selected from the group consisting of elemental sulphur, organic polysulphides, hydrogen sulphide, mercaptans, carbon sulphide, sulphides, disulphides, and thiophenyl compounds.

3. A process according to claim 2, in which the sulphuration agent is selected from the group consisting of elemental sulphur, organic polysulphides, dimethylsulphide and dimethyldisulphide.

4. A process for the preparation of a catalyst, comprising introducing a sulphuration agent into a catalytic mass containing active metals which are cobalt, molybdenum, tungsten, or a mixture of cobalt and molybdenum, and optionally platinum or palladium, treating the mass with hydrogen to produce a sulfided catalyst, wherein more than 50% of said active metals are in the form of $MoS_2$, $Co_9S_8$, or $WS_2$ passivating the sulfided catalyst by contacting with an oxygen containing gas.

5. A process according to claim 4 in which:

a. at least one sulphuration agent is incorporated into the catalytic mass between 30° C. and 200° C. in the presence of at least one solvent and/or at least one constituent containing olefinic carbon bonds, b. heat treatment of the catalyst is carried out in the absence of hydrogen, c. treatment of the catalyst is carried out between 150° C. and 700° C. in the presence of pure or diluted hydrogen, d. the catalyst is cooled to room temperature and left in a stream of an inert gas, e. off-site, oxygen diluted to a concentration of less than about 10% expressed as the volume of oxygen, and air is passed over the catalyst.

6. A process according to claim 3 in which the solvent is a white spirit.

7. A process according to claim 5, in which the constituent is an olefinic hydrocarbon, or an oil derived from fatty acids.

8. A process according to claim 4, wherein treatment with a sulphurating agent and with hydrogen, are simultaneous.

9. A process according to claim 4, in which the catalyst into which a sulphuration agent has been incorporated is treated with pure or diluted hydrogen, at a temperature of between 250° C. and 600° C.

10. A process according to claim 4, wherein the sulphuration agent is introduced at a temperature of 0 to 200° C.

11. A process according to claim 4, wherein the sulphuration agent is employed in an amount so as to introduce 80 to 150% sulfur based on the stoichiometric amount of active metals in the catalyst.

12. A catalytic hydrotreatment process, comprising preparing a catalyst by introducing a sulphuration agent into a catalytic mass to introduce an amount of sulfur of 50 to 150% based on the stoichiometric amount of active metals in the catalyst, treating the mass with hydrogen, to produce a sulfided catalyst, wherein more than 50% of said active metals are in the form of $MoS_2$, $CO_9S_8$ or $WS_2$, passivating the sulfided catalyst by contacting with an oxygen containing gas, transporting the activated catalyst to a reactor, and contacting with a feedstock under hydrotreating conditions.

* * * * *